Figure 5:
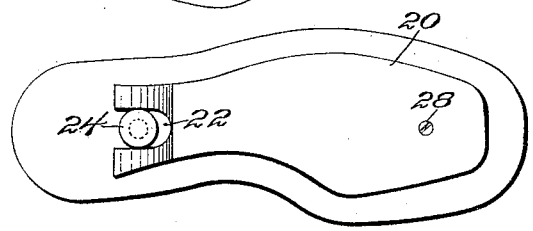
Figure 6:
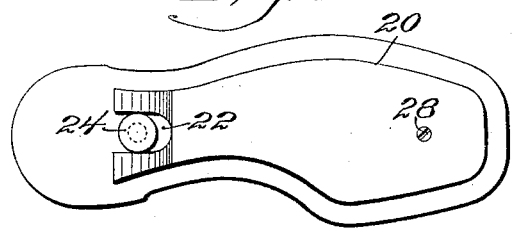
Figure 7:
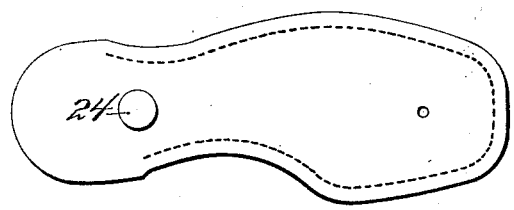
Figure 8:
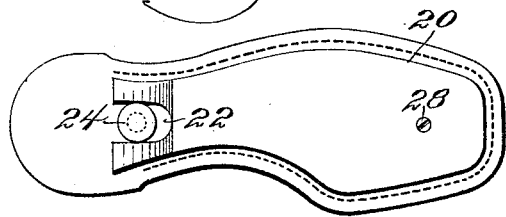

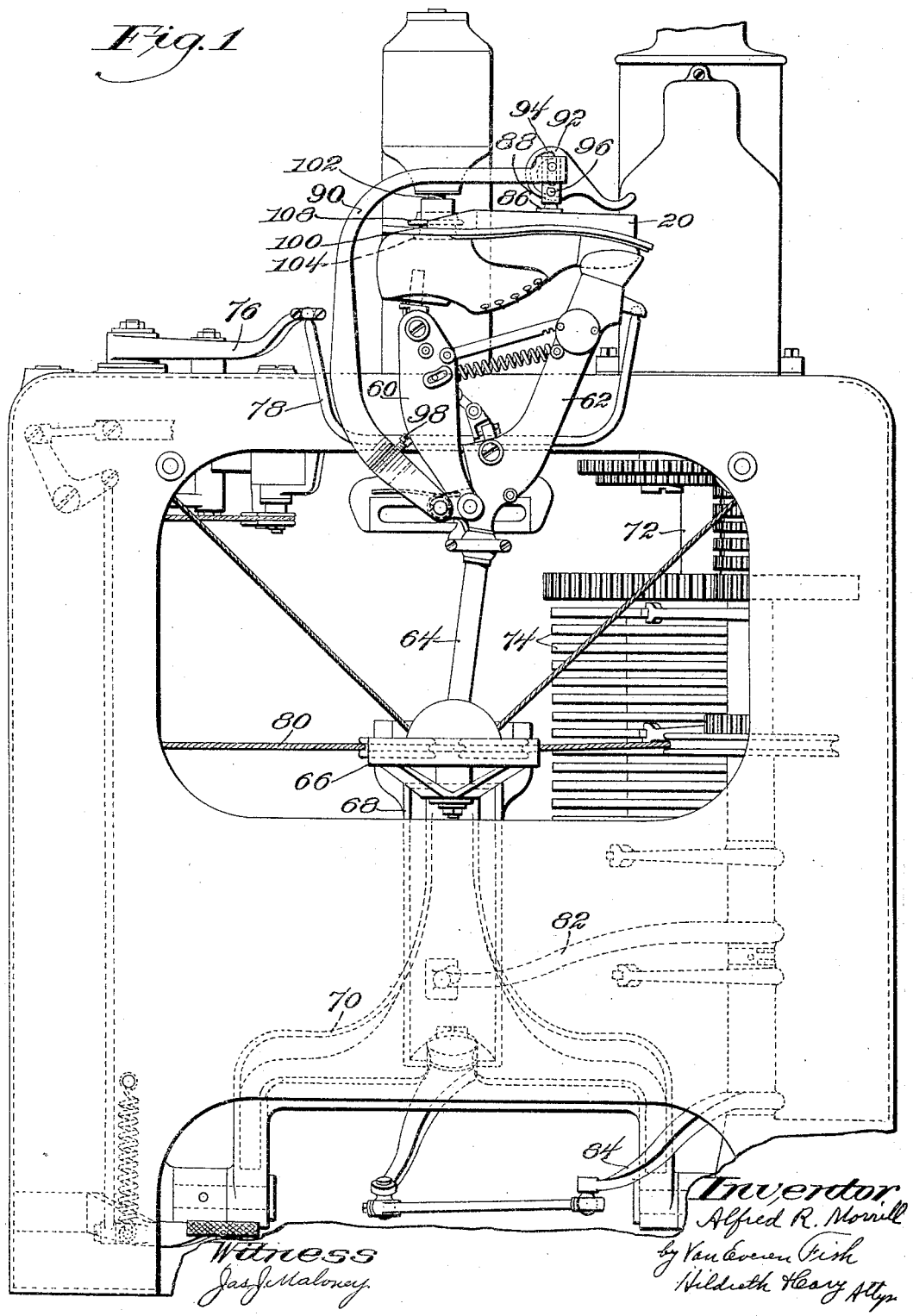

Feb. 14, 1933. A. R. MORRILL 1,897,527
METHOD OF MAKING SHOES
Filed Dec. 6, 1929 10 Sheets-Sheet 2
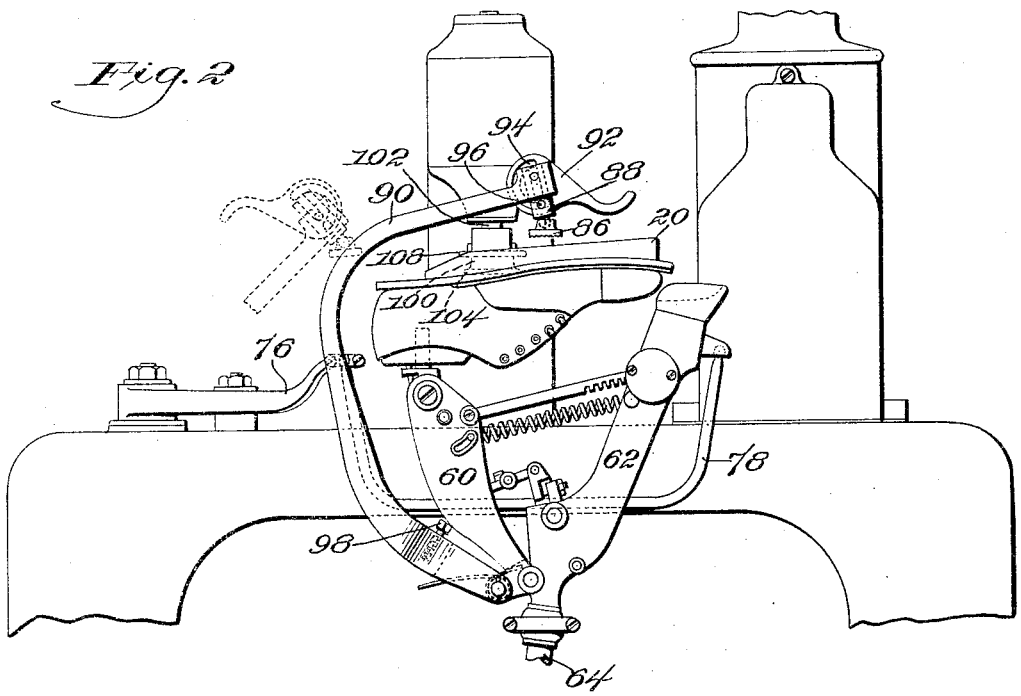
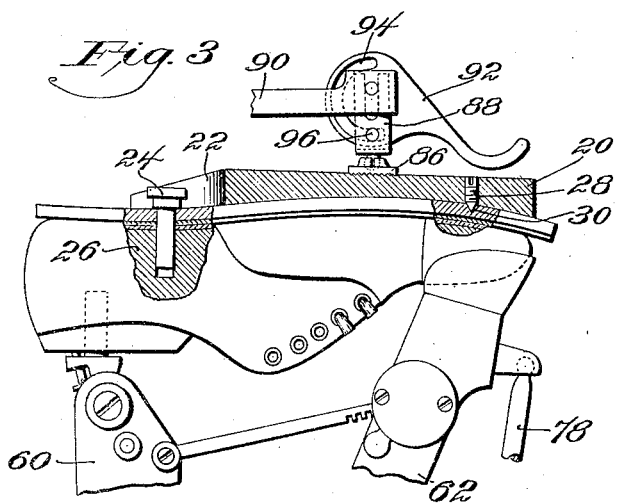

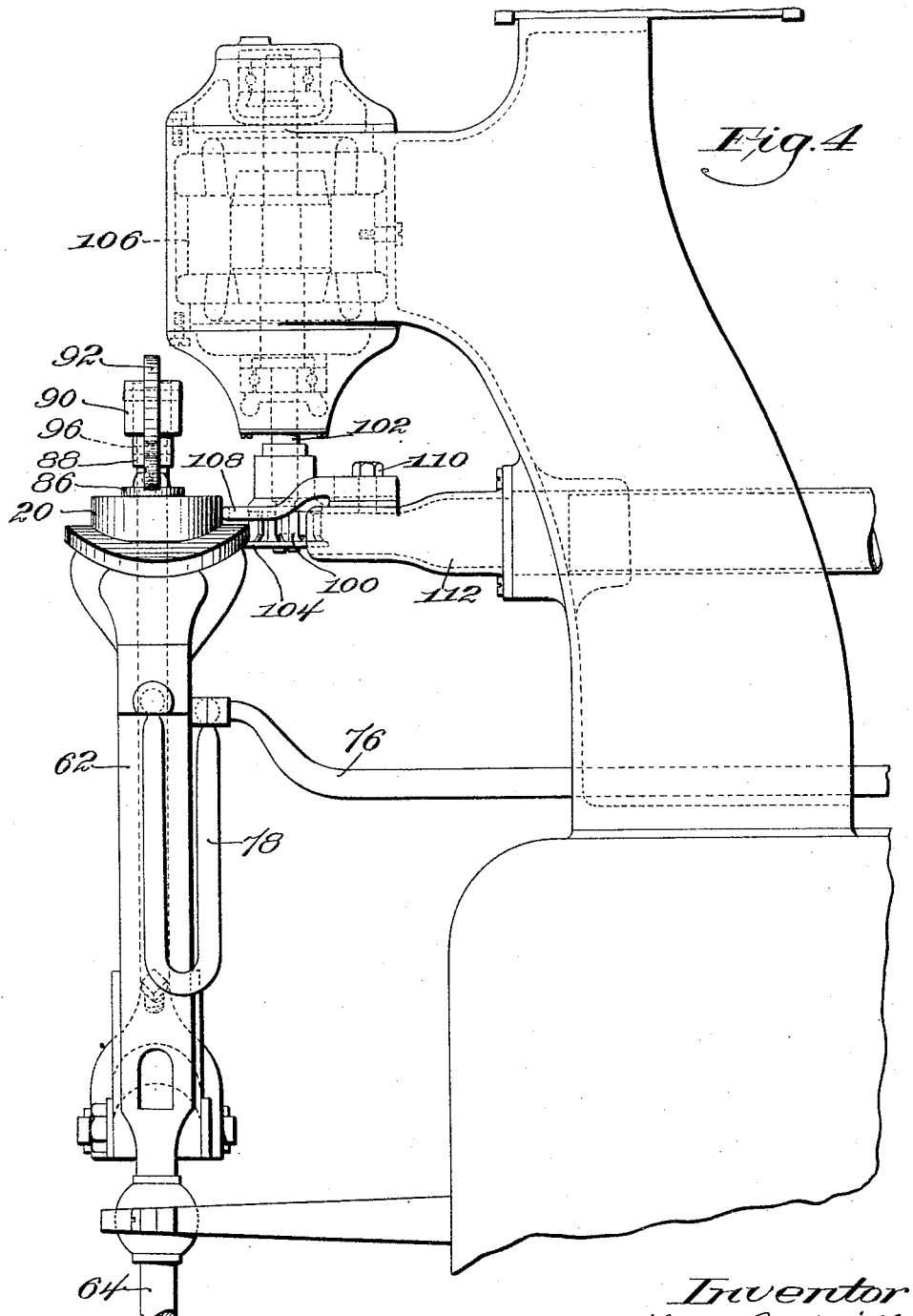

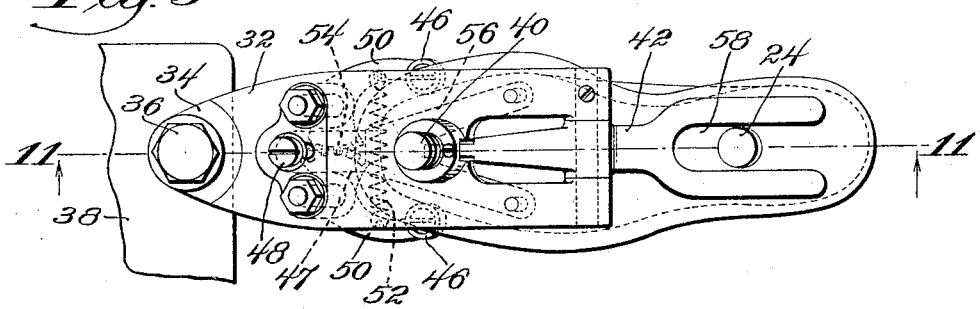
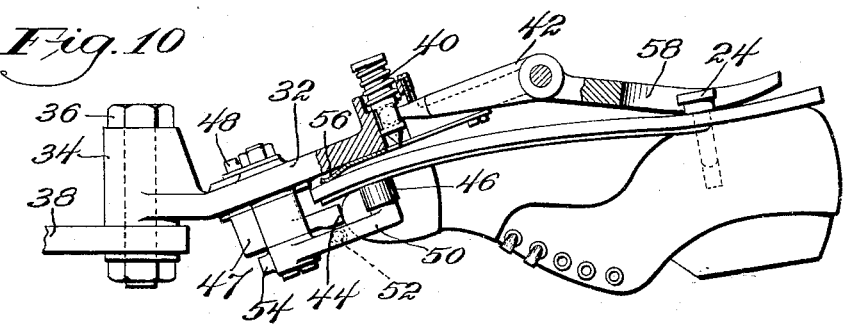
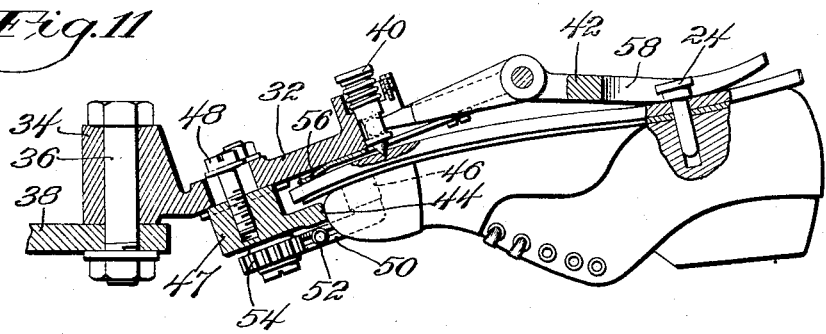
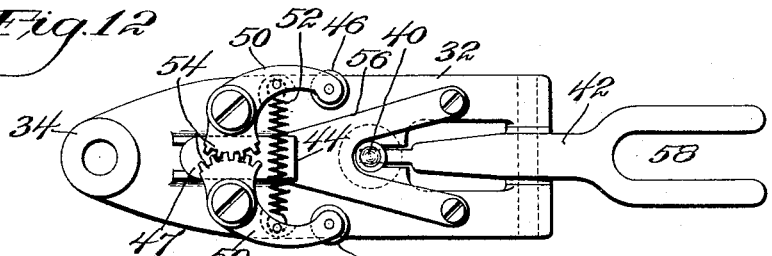
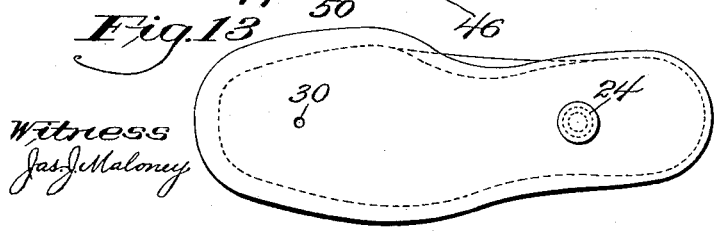

Feb. 14, 1933.   A. R. MORRILL   1,897,527
METHOD OF MAKING SHOES
Filed Dec. 6, 1929   10 Sheets-Sheet 6
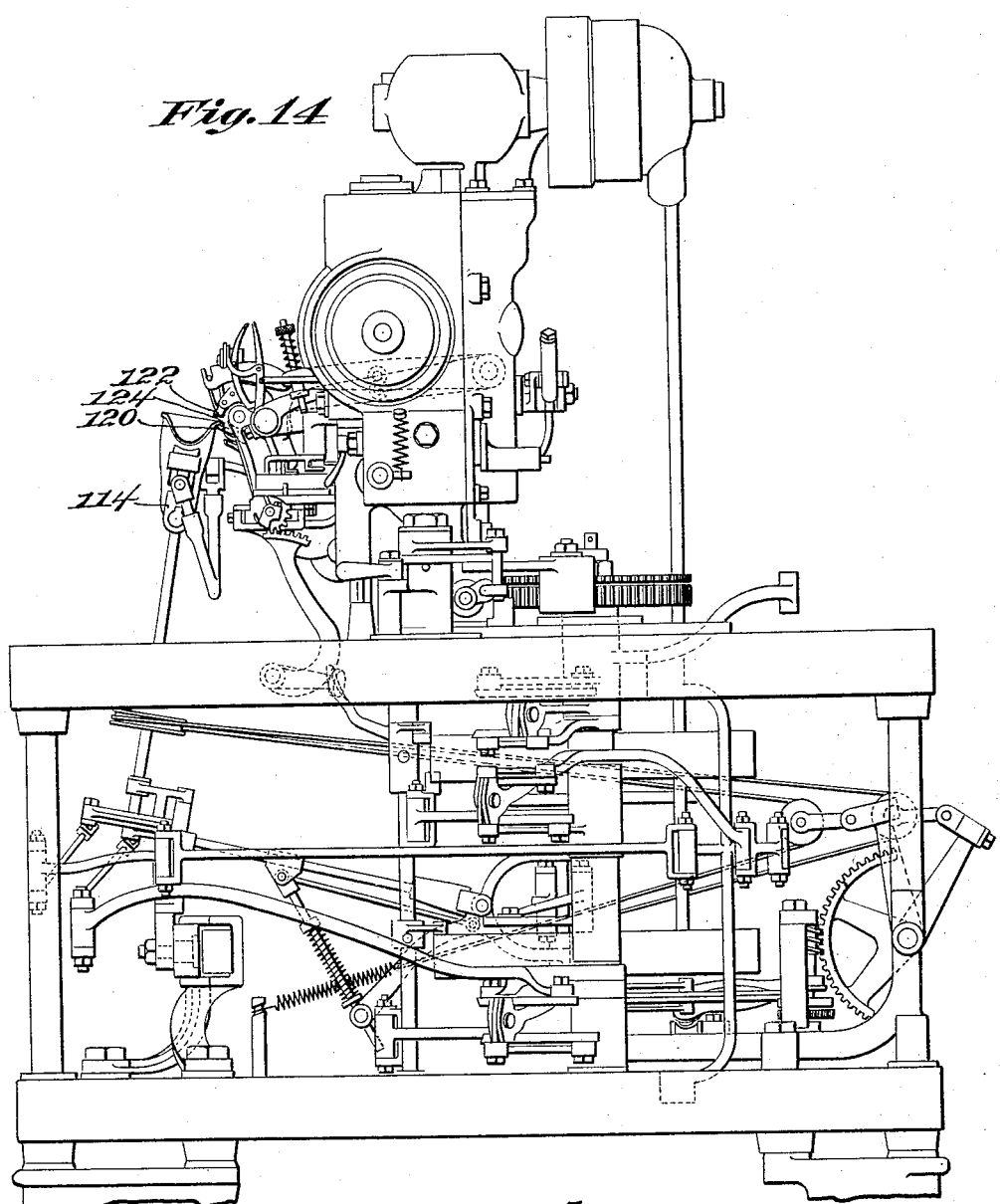
Fig.14
Fig.15
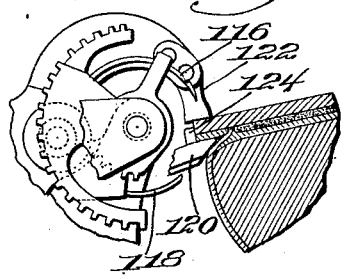
Witness
Jas J. Maloney.
Inventor
Alfred R. Morrill
by Van Everen Fish
Hildreth & Cary Attys.

Feb. 14, 1933. A. R. MORRILL 1,897,527
METHOD OF MAKING SHOES
Filed Dec. 6, 1929    10 Sheets-Sheet 7

Feb. 14, 1933.  A. R. MORRILL  1,897,527
METHOD OF MAKING SHOES
Filed Dec. 6, 1929  10 Sheets-Sheet 9

Witness
Jas J. Maloney.

Inventor
Alfred R. Morrill
by Van Everen Fish
Hildreth & Cary Attys.

Feb. 14, 1933. A. R. MORRILL 1,897,527
METHOD OF MAKING SHOES
Filed Dec. 6, 1929 10 Sheets-Sheet 10

Witness
Jas.J.Maloney.

Inventor
Alfred R. Morrill
by Van Everen Fish
Hildreth Hary Attys.

Patented Feb. 14, 1933

1,897,527

UNITED STATES PATENT OFFICE

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY

METHOD OF MAKING SHOES

Application filed December 6, 1929. Serial No. 412,241.

The present invention relates to certain operations which are performed progressively along the bottom margin of a shoe, and more particularly to the operations of attaching the outsole of a Goodyear shoe and trimming the sole to its final shape and size.

In the manufacture of Goodyear shoes, as ordinarily carried out, the blank from which outsole is finally produced is cemented or otherwise secured to the insole and associated upper while mounted on a last, and the sole is then trimmed roughly to approximately its required shape. After this so-called rough rounding operation, the shoe is presented to an outsole sewing machine which inserts a line of stitches around the edge of the shoe sole and thereby permanently secures the sole to the welt. The shoe sewing machine is provided with a gage which is adapted to bear against the roughly trimmed edge of the shoe sole or against the crease between the sole and the upper and acts in a general way to assist the operator to determine the position of the line of fastenings about the sole of the shoe. The shoe is next presented to an edge trimming machine and the outsole is trimmed down to its final size.

These operations require the services of skilled and experienced operators since the quality of the work produced depends almost wholly upon the skill of the operator in handling the shoe as it is fed to the operating mechanisms of the machines. Moreover, since the depth of the cut made by the trimming knife and the position of the line of stitching in the sewing operation depends largely upon the manner in which the shoe is manipulated, the production of a uniform grade of work by an entire factory or even by a single operator is difficult of attainment.

To obviate the necessity for skilled and experienced operators in stitching the sole to the welt and in trimming the sole to its final desired shape, automatic machines have been devised such, for instance, as are illustrated and described in the patents to Topham No. 1,616,710, dated February 8, 1927 and Topham No. 1,616,715, dated February 8, 1927. To secure the desired results with these machines it is necessary, however, that the work be guided accurately to the operating tools inasmuch as the shoe is mounted upon a shoe suporting jack and is automatically controlled so that no manipulation of the shoe by the operator is permitted as is the case where the shoe is held in the hands of the operator. The problem of guiding the work accurately to the operating tools is complicated by the fact that the contours of the shoe available for use in guiding the shoe are irregular in outline and also the shoes, in the condition in which they come to the machines, embody variations and imperfections due to defective and unskilled shoe-making in preceding operations. In these machines, therefore, the shoe must be guided and controlled automatically in such a manner as to compensate for these irregularities in contour and variations and imperfections in construction or the shoe must be guided and controlled in such a manner that the path of the shoe followed by the operating instrumentalities of the machine is independent of and unaffected by said contour irregularities, variations or imperfections.

It is an object of the present invention to facilitate the operations which are performed progressively along the bottom margin of a shoe and more particularly the operations of attaching the outsole and producing a sole edge of the desired outline and to enable any or all of these operations to be performed in an accurate and reliable manner to produce satisfactory and uniform results without the use of skilled labor and notwithstanding irregularities in the shoe contours or variations and imperfections in the shape or arrangement of the various parts of the shoe produced during preceding shoemaking operations. It is a further object of the invention to provide an improved method of making shoes which will secure the results above enumerated and which can be readily carried out by the use of automatic machinery such for instance as is disclosed in the patents above referred to whereby the production of shoes uniform as to shape and appearance is made possible, and also a reduction in the cost of production as well as the elimination of errors incident to the use of manual labor.

With the above objects in view a feature of the present invention contemplates producing in an improved manner a sole edge of the desired size and outline having a predetermined position with relation to the last contours of the shoe and suitable for use as a guiding means during subsequent operations in which a sole edge can be conveniently put to such use, such for instance as the stitching of the outsole to the welt. In accordance with this feature of the invention an edge trimming operation, under the guidance of a templet, is performed upon the outsole which has been associated with the insole and upper of a shoe, which templet has previously been located in predetermined position on the outsole with relation to the last contours. A sole edge having a regular and even outline throughout its extent is thus produced which sole edge has an exact predetermined size and shape and an exact predetermined location with relation to the other parts of the shoe and more particularly with relation to the last contours. Broadly considered, this feature of the invention contemplates performing the trimming operation before or after the stitching of the outsole to the welt. In accordance with a further feature of the invention, however, the trimming operation is performed prior to the stitching of the outsole to the welt and thereafter the shoe is presented to a sole stitching machine and the sole stitching operation is performed upon the shoe under the guidance of the sole edge. The outseam is thus located in exact predetermined position with relation to the sole edge, and consequently in exact predetermined position with relation to the last contours of the shoe. In accordance with a further feature of the invention the shoe, after the sole stitching operation has been thus performed, may be subjected to a final edge trimming operation to reduce the edge to the exact size which it is to have in the completed shoe, this final edge trimming operation being performed under the guidance of a templet which has been located in predetermined position on the outsole.

In addition to the features of invention above referred to, the present invention also contemplates locating the templet upon the outsole in a novel, simple and efficient manner. In accordance with this feature of the invention a mark in the form of an indentation or perforation is formed in the outsole at a predetermined point with relation to the last contour and a pin or other suitable positioning surface is provided upon the templet, which positioning surface is so located that the bringing into engagement of the positioning surface with the mark on the outsole will locate a portion of the templet in the proper predetermined position on the outsole. Preferably the toe portion of the templet only will be located on the outsole in the manner above stated, the heel portion of the templet being located on the outsole by the engagement of a positioning surface, which may be in the form of a slot, with a pin projecting from the last through a perforation in the outsole.

The method of making shoes constituting the present invention can readily be carried out by the use of automatic machines in performing certain of the operations and consequently the drawings accompanying this application illustrate so much of such machines as is necessary to indicate their manner of use, the drawings also illustrating an apparatus which may be used in locating the templet on an outsole in predetermined position with relation to the last contour.

Figure 16:
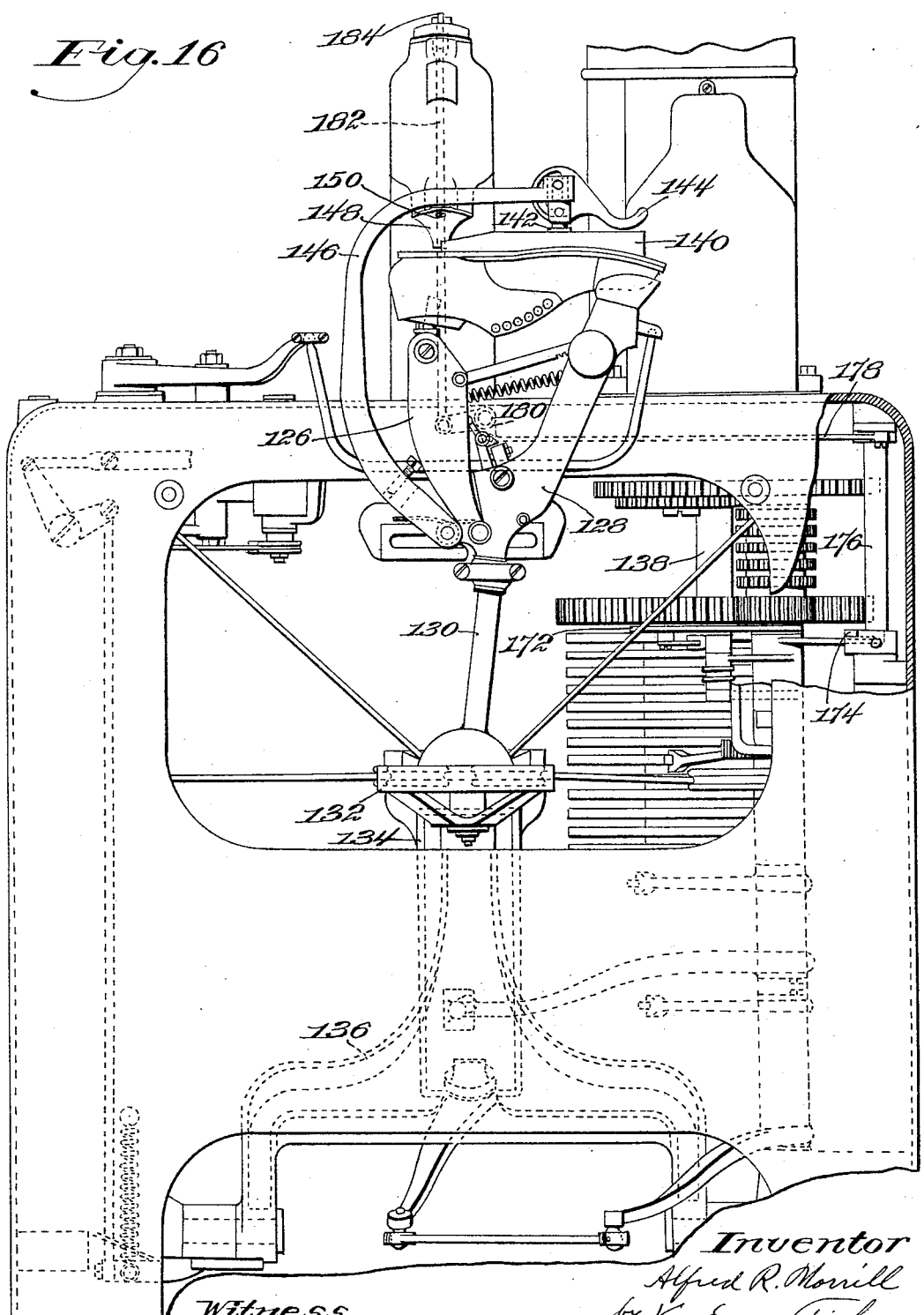
Figure 17:
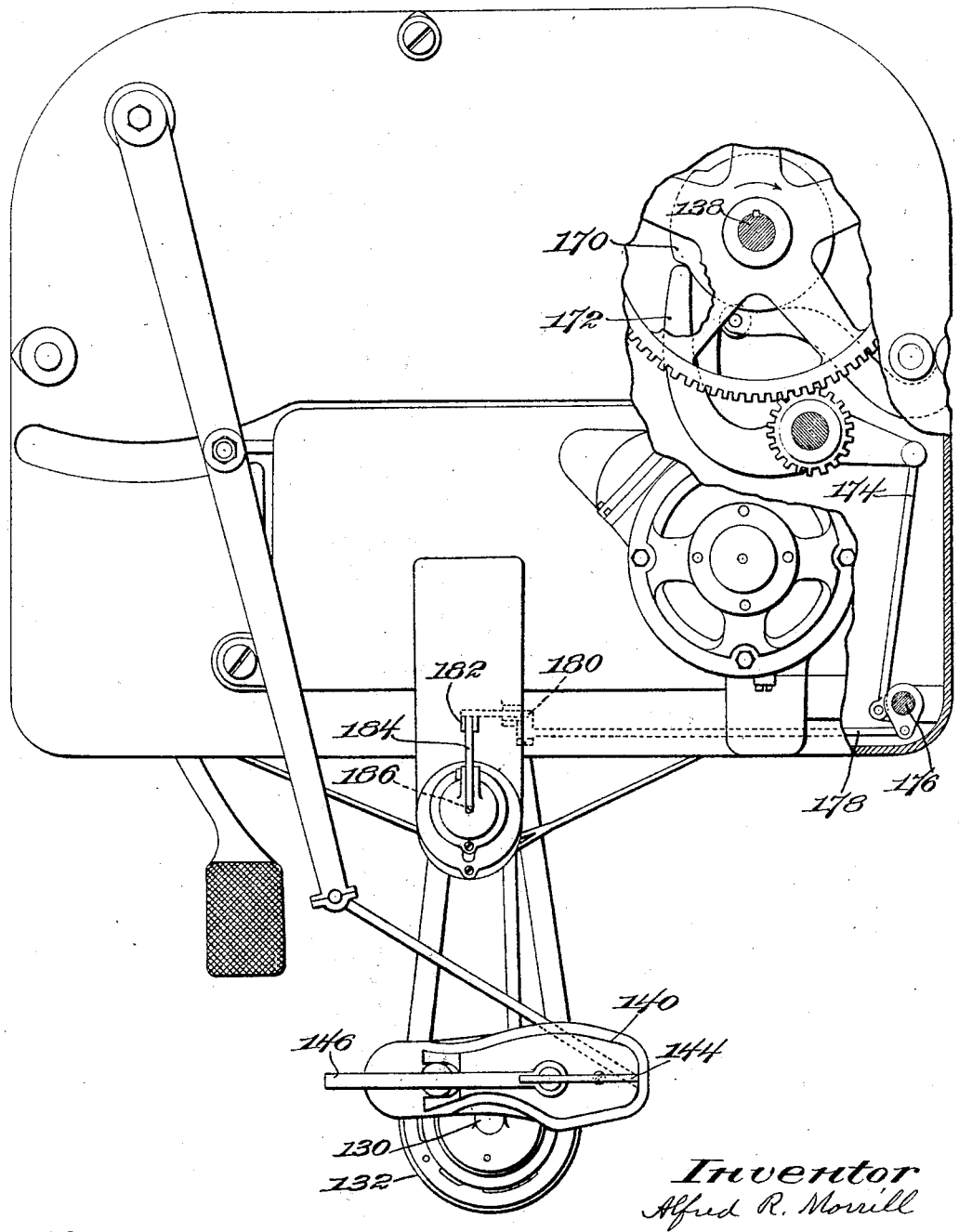
Figure 18:
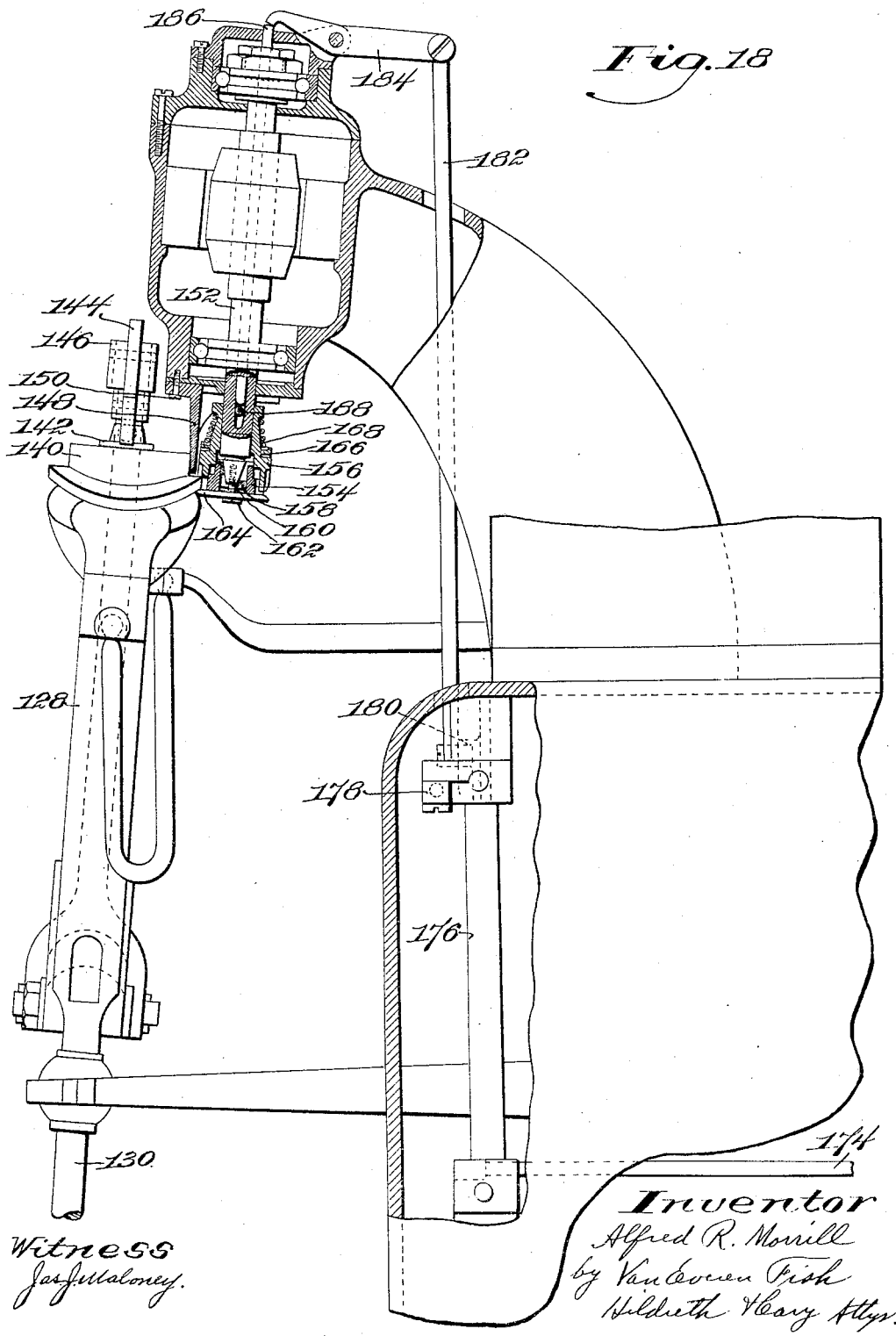
Figure 19:
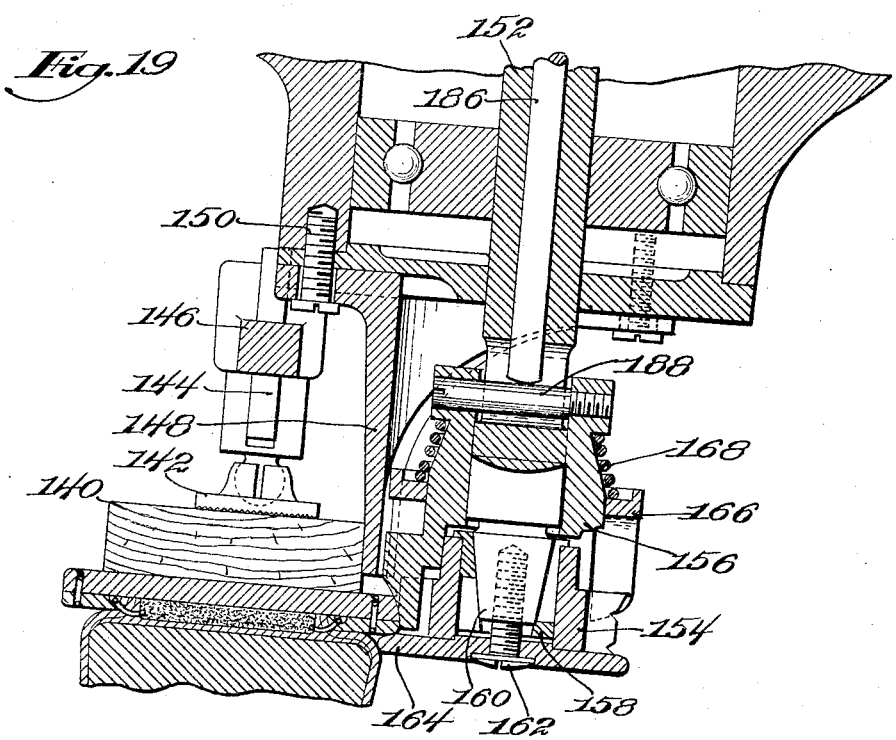

Referring to the drawings Fig. 1 is a view in front elevation of an automatic edge trimming machine, hereinafter referred to as a rounding machine, provided with an automatic jack and showing a templet clamped to the shoe outsole; Fig. 2 is a view in front elevation of the head of the machine illustrating particularly the jack in the open position to which it is returned at the end of the rounding operation, the position to which the clamp is moved by gravity being indicated in dotted lines; Fig. 3 is a detail view partly in section showing the shoe in position on the jack with the templet clamped on the outsole; Fig. 4 is a view of the machine in right side elevation corresponding to Fig. 1; Figs. 5 to 8 inclusive are somewhat diagrammatic plan views of the outsole of the shoe and the templet illustrating certain steps in the method herein described; Fig. 9 is a plan view of the marking device for pricking the outsole; Fig. 10 is a view partly in section of the parts shown in Fig. 9; Fig. 11 is a sectional view taken on the line 11—11 of Fig. 9; Fig. 12 is a plan view looking from beneath, of the marking device; Fig. 13 is a plan view of the shoe showing the perforation made in the outsole by the marking device; Fig. 14 is a view in right side elevation of the outsole stitcher utilized for sewing the outseam; Fig. 15 is a detail view in left side elevation of some of the parts of the outsole stitcher with the shoe in section; Fig. 16 is a view in front elevation of the automatic edge trimming machine with a templet clamped on the shoe preparatory to starting the final trimming operation on the shoe; Fig. 17 is a plan view of the machine illustrated in Fig. 16; Fig. 18 is a view in right elevation partly in section of the machine as shown in Figs. 16 and 17; and Fig. 19 is a detail view on a larger scale of certain of the parts shown in Fig. 18 with the shoe and templet in section.

The specific processes which may be practiced in accordance with the present invention by the use of the devices and machines illustrated in the drawings comprise locating a templet in predetermined position on the outsole of a shoe, performing a trimming or rounding operation under the guidance of the templet to produce a sole edge of a shape, size and location with relation to the last contour determined by the templet, performing a sole sewing operation under the guidance of the sole edge to attach the outsole permanently to the shoe, again locating a templet in predetermined position on the outsole and performing an edge trimming operation under the guidance of the templet to give the sole edge a final shape and size as determined by the templet. By first forming a sole edge of predetermind shape, size and location with relation to the last contour the outseam can be located in exact predetermined relation to the sole edge and to the last contour and thus a templet can be used safely during the final trimming operation to produce an edge of the desired shape and size without liability of cutting into the the stitches of the seam, and this edge will have a regular, even outline throughout, and will be at the proper distance from the outseam and upper at all points around the shoe.

The templet illustrated in the drawings is indicated at 20 (see Figs. 1, 3, and 5) and consists of a rigid block of wood, the under surface of which, that is, the surface which contacts with the tread surface of the outsole of the shoe, is concaved both longitudinally and laterally to permit the templet to fit closely against the sole surface. In the construction illustrated in the drawings, the templet is designed to constitute a guide during the operation of the tool or tools around the forepart and shank only of the shoe, the operation terminating at both sides of the shoe at substantially the breast line of the completed shoe. Consequently, the templet is shaped to extend over the forepart and shank only and is formed with a peripheral contour corresponding to the outline which the edge of the outsole is to have in these parts of the finished shoe. The templet when in use is located on the shoe, as indicated in Fig. 5 with its peripheral contour at some distance inside of the sole edge.

The templet is designed to be used in connection with a lasted shoe and to enable it to be located in exact predetermined position with relation to the last contour of the shoe, it is provided with positioning surfaces adapted to cooperate with corresponding positioning surfaces on the lasted shoe. The shoe illustrated in the drawings is one in which the parts have been assembled in accordance with the method disclosed in the patent to George E. Warren, No. 1,706,504 dated March 26, 1929. The outsole of this shoe is provided with a perforation near the heel end which was utilized in locating the outsole upon the lasted upper and insole. In the construction illustrated in the drawings, this perforation is utilized in locating the templet 20 on the outsole, a slot 22 being formed in the heel end of the templet, shaped to engage the head of a pin 24 projecting from the last 26 through the perforation above referred to. The engagement of the sides of the slot 22 with the head of the pin 24 determines accurately the position of the heel portion of the templet on the outsole laterally of the shoe. The position of the toe portion of the templet laterally of the shoe and also the position of the templet longitudinally of the shoe is determined by cooperating positioning surfaces consisting of the conical end of a pin 28 projecting from the sole engaging surface of the templet and a corresponding indentation 30 formed in a predetermined location in the surface of the sole adjacent the toe end.

The pin 24, being in engagement with the hole in the last of the shoe, has a predetermined position with relation to the last contour. In order to form an indentation 30 in the outsole of the shoe in an exact predetermined position with relation to the last contour, a marking machine of suitable construction may be used, such, for instance, as is illustrated in Figs. 9 to 12 of the drawings. This marking machine forms the subject-matter of an application for patent filed of event date herewith. Briefly described, this marking machine comprises a frame consisting of a plate 32 extending upwardly and outwardly from a boss 34 through which a bolt 36 passes by means of which the frame may be rigidly secured to a suitable fixed support 38. For forming the indentation, a pricking pin 40 is mounted to reciprocate in a guideway formed in the plate 32 and is engaged by the forward end of an actuating lever 42. The shoe to be marked is held by the operator with the tread surface of the sole uppermost and with the toe portion or forepart of the shoe sole beneath the plate 32. The rear end of the lever 42 extends over the heel portion of the shoe which is being presented to the marking device so that an upward movement of the heel portion of the shoe, after being located in proper position with relation to the pricking pin, actuates the pin to indent the sole.

To locate the shoe in proper position with relation to the sole pricking pin, gaging devices are provided to engage both the toe and heel portions of the shoe.

The gaging devices which operate at the toe portion of the shoe comprise an end gage 44 to contact with the last supported upper at the extreme toe end of the shoe, and side gages 46 to contact with the shoe at each side of the toe portion. These gages contact with the last supported upper and thus locate the shoe and the surface of the outsole in predetermined position with relation to the last contour of the shoe. The gage 44 determines the longitudinal position of the shoe and is formed on a block 47 which is secured to the plate 32 so as to be capable of an adjustment longitudinally of the shoe by means of a bolt 48 passing through a slot in the plate. The gages 46 act to position the toe portion of the shoe laterally and are carried upon arms 50 pivotally mounted upon the plate 32. These arms are yieldingly forced toward each other by means of a connecting spring 52 and in order to cause the arms to move in unison toward and from each other so as to locate the toe portion of the shoe with relation to the indenting pin, their hubs are provided with inter-meshing gear segments 54. The gages 46 are in the form of rolls and as the shoe is inserted into the machine these rolls extend beneath the projecting edge of the shoe sole and bear at their upper ends against the under surface of the sole. A spring plate 56 is secured to the under surface of the plate 32 of the frame and at its rear end bears against the tread surface of shoe sole adjacent the toe and acts to force the shoe yieldingly down into contact with the upper ends of the rolls 46.

The gaging devices for the heel portion of the shoe comprise a slot 58 formed in the rear end of the pin actuating lever 42 which slot is shaped to engage the head of the pin 24 projecting from the last of the shoe through the outsole of the shoe.

The machines illustrated in the drawings which may be used in performing the sole rounding, sole sewing, and final edge trimming operations are automatic machines of the type illustrated in the patents to Topham hereinbefore referred to, each machine comprising suitable tools or devices for performing an operation on the shoe, a jack upon which the shoe is supported, and means for automatically controlling the movements of the jack so that no manual manipulation of the shoe by the operator is required during the operation. In the use of these machines the shoe is first marked in the manner above described. A templet is placed on the shoe in the position determined by the cooperating positioning surfaces on the templet and shoe, and the shoe is placed on the jack of the sole rounding machine.

The sole rounding machine is illustrated in Figs. 1, 2, 3, and 4, and is similar in many respects to the final edge trimming machine illustrated in the drawings and hereinafter described. The final edge trimming machine forms the subject-matter of a pending application filed of even date herewith.

The jack of the sole rounding machine comprises heel and toe supports 60 and 62 which are supported upon a vertical spindle 64 and which are actuated to clamp the shoe automatically in proper position on the jack when the shoe is placed upon the jack by the operator and which are automatically actuated at the conclusion of the rounding operation to unclamp the shoe. This jack is the same in construction and mode of operation as the jack disclosed in applicant's prior Patent No. 1,689,594 dated October 30, 1928. After the shoe is clamped in position on the jack, the templet is clamped in position on the shoe as hereinafter described and the shoe is moved by the operator into starting position with relation to the sole rounding cutter. During the sole rounding operation the jack is moved in the direction of feed and is rotated to transfer the point of operation about the shoe from the breast line of the shoe at one side to the breast line at the other side, and simultaneously tipping movements are imparted to the jack to compensate for the transverse and longitudinal curvatures of the tread surface of the shoe sole. To enable the jack to be so actuated, it is mounted in the machine in the same manner as the jack of applicant's prior patent above referred to and is acted upon by mechanism constructed, arranged and operated as the corresponding mechanism of the machine of said patent.

Briefly stated, the jack supporting structure comprises an arm 66 in the forward end of which the lower end of the jack spindle 64 is rotatably mounted by means of a gimbal joint, a support 68 upon which the arm 66 is mounted to swing vertically, and a frame 70 pivotally mounted at its lower end in the machine base so as to be capable of swinging about a horizontal axis and upon which the support 68 is mounted to swing about a substantially vertical axis. The mechanism for moving the jack in the direction of feed, for rotating the jack and for imparting tipping movements to the jack, comprises a vertical pattern cam shaft 72 upon which a series of pattern cams 74 are mounted, and connections from the cam shaft to the jack and jack supporting structure comprising the feed lever 76 connected by the link 78 to the toe portion 62 of the jack, the cord 80 passing around a wheel mounted in the forward end of the arm 66 and connected through the gimbal joint to the jack spindle 64, and cam levers 82 and 84 connected respectively to the frame 70 and support 68. The cam shaft 72 is driven through nearly a complete revolution during the sole rounding operation on a shoe, whereupon an auxiliary mechanism is thrown into operation which moves the jack out of operative position toward the front of the machine, and the rotation of the cam shaft is continued to rotate the jack in a reverse direction to its original position. During this reverse rotation of the jack the heel and toe supports 60 and 62 are relatively actuated to unclamp the shoe from the jack. The mechanisms for actuating and controlling the jack during the sole rounding operation, for moving it outwardly at the conclusion of the operation, for reversely rotating it to its original position and for unclamping the shoe, are fully illustrated and described in applicant's prior patent above referred to, to which reference may be had for a full disclosure of the parts not indicated on the drawings.

After the shoe is placed on the jack and before it is moved into operating position with respect to the sole rounding tools, the templet is firmly clamped upon the lasted shoe. For this purpose, a clamping plate 86 is provided, arranged to engage the upper surface of the templet while the shoe is in clamped position on the jack. This plate is mounted by a ball and socket joint on the lower end of a plunger 88 which is arranged to slide in a vertical guideway in the outer end of a supporting arm 90. For actuating the plunger 88 to force the clamp 86 against the templet a cam lever 92 is pivotally mounted in the outer end of the arm 90 and is provided with a cam slot 94 which is engaged by a pin 96 mounted in the plunger. For convenience of manipulation, both as regards placing the shoe with its templet on the jack and clamping the templet on the shoe, the supporting arm 90 is curved rearwardly and downwardly and is pivotally supported at its lower end on the lower portion of the heel support 60 of the jack. In clamping the templet on the shoe, the arm is drawn forwardly so as to bring the clamp in the proper position and then the clamping lever 92 is actuated by hand to clamp the templet firmly to the shoe. At the conclusion of the rounding operation, however, as the jack is moved outwardly and the jack is reversely rotated, the shoe is automatically unclamped from the jack as hereinbefore described and this action of the jack in unclamping the shoe moves the shoe downwardly slightly so as to relieve the pressure of the clamp 86 against the templet. The templet is thus unclamped automatically simultaneously with the unclamping of the shoe from the jack. To aid in this templet unclamping operation, and also to facilitate the positioning of the clamp 86 after a new shoe is placed on the jack, an adjustable set screw 98 is provided near the lower end of the supporting arm 90 and is arranged to bear against the heel support 60 of the jack.

The sole rounding cutter of the rounding machine is indicated at 100, (see Fig. 4) and comprises a series of cutting blades of ordinary construction formed on a hub secured to the lower end of a substantially vertical shaft 102. Below the cutter 100 a guard plate 104 is secured to the lower end of the shaft 102 and is adapted to enter the crease between the upper and the projecting sole of the shoe, and thus form a gage for controlling the vertical position of the shoe. For imparting a rapid rotation to the shaft 102 and the rounding cutter 100 mounted thereon, the shaft 102, in the construction illustrated, forms the continuation of the armature shaft of an electric motor 106 which is mounted in an overhanging arm of the head of the machine.

The shoe supporting jack is yieldingly pressed inwardly as in the machine of applicant's prior patent and, in order to cause the outsole of the shoe to be trimmed to a size and shape exactly predetermined by the size and shape of the templet, a fixed guide is provided against which the peripheral edge of the templet is held during the transfer of the point of operation of the rounding cutter about the shoe. This fixed guide is indicated at 108 and consists of a plate, the forward end of which is arranged to extend over the outsole of a shoe presented to the cutter and bear against the peripheral edge surface of the templet as indicated in Fig. 4. The plate 108 is provided with an opening through which the cutter 100 passes and is secured at its rear end by means of a bolt 110 to the forward end of the exhaust nozzle 112 through which the chips produced by the cutter are discharged from the machine. The guide 108 engages the templet at a point in line with the rounding cutter in the direction of the inward and outward movements of the jack so that the cutter always acts on the sole at the same distance from the periphery of the templet and a sole edge is produced having a regular and even outline throughout its extent and of a size and shape exactly predetermined by that of the templet. Also, in view of the fact that the templet is located in predetermined position with relation to the other parts of the shoe, and more particularly with relation to the last contour, the edge produced by the cutter will also have an exact predetermined location with relation to the other parts of the shoe and to the last contour.

The machine illustrated in the drawings for performing the sole sewing operation is the same in all essential particulars as the automatic outsole shoe sewing machine disclosed in Topham Patent No. 1,616,710 hereinbefore referred to and Topham Patent No. 1,616,711 dated February 8, 1927, the only difference being that in the machine of the drawings an edge gage, stationarily mounted upon the work table of the machine is used instead of the gages disclosed in the Topham patents. Referring to Figs. 14 and 15, the shoe supporting jack is indicated at 114, the needle of the stitch forming devices at 116, the awl at 118, the work table at 120 and the presser-foot at 122. Before the shoe is placed in this machine the templet is removed so that the edge which has been produced under the guidance of the templet may be used to control the location of the outseam. After the shoe is placed on the jack it is moved into the machine and assumes the position with relation to the stitch forming devices indicated in Fig. 15. The table 120 engages the crease between the projecting sole and the upper and in cooperation with the presser-foot 112 determines the vertical position of the shoe and jack. The distance of the outseam stitches from the edge of the sole is controlled by an edge gage 124 attached to or forming an integral part of the table 120. As the point of operation of the stitch forming devices is transferred around the shoe, the sole edge remains in contact with the edge gage and consequently the outseam is formed throughout its length at a uniform fixed distance from the edge of the sole. Inasmuch as the outline of the shoe sole has a predetermined exact position with relation to the other parts of the shoe and the last contour, the outseam will be properly located on the shoe.

Before the shoe is presented to the machine for performing the final edge trimming operation, the templet which was used during the rough rounding operation, or another templet of the desired shape and size, is placed upon the shoe sole, being located as hereinbefore described by the cooperating positioning surfaces on the templet and shoe. After the templet has been thus located on the shoe sole, the shoe is placed on the jack of the final edge trimming machine. This machine, except as hereinafter described, is the same in construction and mode of operation as the rounding machine hereinbefore described, being provided with a similar automatic jack and similar mechanism for clamping the templet upon the jacked shoe, and similar mechanism for actuating and controlling the jack. Referring to Figs. 16 to 19 inclusive, the heel and toe supports of the jack are indicated at 126 and 128, the jack spindle at 130, the jack supporting structure at 132, 134 and 136, the pattern cam shaft at 138, the templet at 140, the templet clamp at 142, the lever for actuating the templet clamp at 144, and the support for the templet clamping lever at 146. The fixed guide which cooperates with the templet during the final trimming operation is indicated at 148 and consists of a finger projecting downwardly from a block adjustably secured to an overhanging portion of the head of the machine by a bolt 150 passing through a slot in the block. By means of this adjustable connection, the guide 148 may be so located as to cause the desired amount of material to be removed by the trimming cutters.

The trimming cutters are mounted upon the lower end of a substantially vertical shaft 152 which, as in the sole rounding machine hereinbefore described, constitutes the armature shaft of an electric motor mounted in an overhanging arm of the machine head. In trimming the outsole of a shoe to its final shape, it is often desirable to trim the shank portion of the shoe sole to a different shape, transversely of the edge, from the forepart. Accordingly, the edge trimming machine illustrated in the drawings is provided with two edge trimming tools of different shapes, one of which is designed to operate upon the forepart of the sole and the other upon the shank portion of the sole. Each of these tools comprises a hub and radial blades projecting therefrom, the forepart tool being indicated at 154 and the shank tool at 156. In order to enable these tools to be readily interchanged without disturbing the position of the jacked shoe, they are arranged to telescope one over the other, the forepart tool 154 being rigidly secured to the lower end of the shaft 152 and the shank tool being arranged to slide longitudinally of the shaft. The blades of the tools alternate, the blades of the tool 156 being located between the blades of the tool 154. The tool 156 is somewhat larger in diameter so that when the tool 156 is in its lowest position it forms a shield for the cutting blades of the forepart tool. When the shank tool is raised, the blades of the forepart tool are exposed and the forepart tool becomes operative. The forepart tool is locked to the shaft by means of a split collar 158 seated within the hub of the tool upon a tapered portion 160 at the lower end of the shaft. The collar 158 is forced upwardly on the tapered portion 160 by means of a clamping screw 162 and this clamping screw also serves to hold upon the lower end of the shaft or upon the tool 154 a guard plate 164 which is arranged to enter the crease between the projecting sole edge and the upper of a shoe being operated upon. This plate 164 determines the vertical position of the shoe in the same manner as the corresponding plate of the rounding machine hereinbefore described. If desired, and as shown in the drawings, a third cutting tool may be provided in the form of a feather edger or burr remover. This tool is indicated at 166 and comprises a ring surrounding a hub on the shank tool 156 and provided with downwardly extending fingers which pass between the blades of the shank tool and are provided with shoulders resting upon the upper end of the forepart tool 154. A spring 168 coiled around the hub of the shank tool 156 and interposed between the tool 166 and a flange at the upper end of the hub of the shank tool tends to hold the shank tool in raised position.

An automatic edge trimming machine provided with interchangeable forepart and shank tools has heretofore been devised and is disclosed in the patent to Topham No. 1,616,715 hereinbefore referred to. In that machine, however, the interchange of the tools was effected manually and it was necessary to stop the mechanism for feeding and controlling the jack during the interchange of the tools and then again throw this mechanism into operation. The edge trimming machine illustrated in the drawings of the present application overcomes this difficulty by the provision of means for automatically effecting the interchange of the tools so that the change is made during the continued operation of the machine and at exact predetermined points in the trimming operation without any attention on the part of the operator. To effect this interchange of the tools during the trimming operation, a cam is provided upon the pattern cam shaft 138 of the machine and suitable connections are provided between the cam and the shank tool 156. The cam which has been provided on the shaft 138 is indicated at 170 (see Fig. 17) and the connections between the cam and the shank tool comprise a lever 172 one end of which bears against the cam and the other end of which is connected by a link 174 to the arm projecting from a rock shaft 176 (Fig. 16). Another arm of this rock shaft is connected by a link 178 to the vertical arm of a bell crank 180, the horizontal arm of which is connected by a link 182 to one end of a lever 184. The other end of the lever 184 is arranged to bear against the outer upper end of a rod 186 arranged to slide axially in the shaft 152 and engaging at its lower end a pin 188 secured to the hub of the shank trimming tool and extending through a slot in the shaft 152. An actuation of these connections from the cam 170 will force the shank trimming tool downwardly into an operative position against the force of the spring 168, as will be obvious, and upon the passage of a low portion of the cam beneath the lever 172 the shank tool will be returned to its upper position by the spring 168.

At the conclusion of the trimming operation the jack will be moved away from the trimming tools toward the front of the machine and rotated in a reverse direction to its original position, the shoe will be automatically unclamped from the jack and the templet will be unclamped in the same manner as hereinbefore described in connection with the sole rounding machine. Inasmuch as the final trimming operation is performed under the guidance of a templet having an exact predetermined location with relation to the various parts of the shoe and the last contour, and the outseam prior to the final trimming operation has been located in exact predetermined position, the shoe resulting from the operation will have a sole edge of a predetermined shape and size the outline of which will be regular and even throughout, and located at the proper distance from the outseam and upper at all points around the shoe. Also, successive shoes can be produced in which the outsoles are all of the same shape and size and together with their outseams present the same appearance.

The invention having been thus described, what is claimed is:—

1. A process of making shoes which comprises indenting the outsole of a shoe while supported upon a last at a predetermined point with relation to the last contour, and utilizing a positioning surface on a templet to engage with the indentation to locate the templet in predetermined position on the outsole.

2. A process of making shoes which comprises indenting the outsole of a shoe while supported upon a last at a predetermined point with relation to the last contour, utilizing a positioning surface on a templet to engage with the identation to locate the templet in predetermined position on the outsole of the last supported shoe, and thereafter performing an edge trimming operation on the outsole of the last supported shoe under the guidance of the templet to produce a sole edge having an outline of a shape and size determined by the templet.

3. A process of making shoes which comprises utilizing positioning surfaces on a templet having a shape similar to that of the outsole in the completed shoe to locate the templet in predetermined position on an outsole which has been associated with the insole and upper of a shoe upon a supporting last, and thereafter performing an edge trimming operation on the outsole of the last supported shoe under the guidance of the templet to produce a sole edge having an outline of a shape and size determined by the templet.

4. A process of making shoes which comprises bringing the toe portion of the upper of a lasted shoe comprising an upper, insole and associated outsole into engagement with side and end gages, prick marking the sole while the shoe is positioned by the gages, providing a templet with a positioning pin, locating the templet on the outsole by bringing the pin into engagement with the prick mark, and performing an operation on the sole under the guidance of the templet.

5. A process of making shoes which comprises forming a prick mark at a predetermined point on the outsole, providing a templet with a positioning pin, locating the templet on the outsole while supported upon a last with the upper and insole of the shoe by bringing the pin into engagement with the prick mark, and performing an operation on the sole while supported upon a last with the upper and insole under the guidance of the templet.

6. A process of making shoes which comprises providing an outsole with a perforation, mounting the outsole upon a lasted upper and insole, providing a templet with a positioning surface, locating the templet on the outsole by bringing said positioning surface into engagement with a pin projecting from the last through the perforation in the outsole, and performing an operation on the outsole under the guidance of the templet.

7. A process of making shoes which comprises mounting an upper and an insole on a last, providing an outsole with a perforation, utilizing the perforation in locating the outsole on the upper and insole while supported on the last, utilizing the perforation in locating a templet on the outsole of the lasted shoe, and performing an operation on the outsole while supported on the last with the upper and insole under the guidance of the templet.

8. A process of making shoes which comprises presenting a lasted shoe comprising an upper, an insole and associated outsole to a sole rounding cutter, relatively moving the shoe and cutter to produce a sole edge having an outline of predetermined shape and size, thereafter forming a seam attaching the outsole to the shoe under the guidance of the sole edge, and thereafter presenting the shoe to an edge trimming machine to trim the outsole to a shape and size determined by a templet located on the outsole.

9. A process of making shoes which comprises locating a templet on an outsole which has been associated with the insole and upper of a shoe, edge trimming the outsole to a contour determined by that of the templet, removing the templet, forming a seam attaching the outsole to the shoe under the guidance of the sole edge, again locating a templet on the outsole, and trimming the edge of the outsole to a predetermined shape and size under the guidance of the templet.

10. A process of making shoes which comprises pricking the outsole of a shoe at a predetermined point with relation to the insole and upper associated therewith, locating a templet on the outsole with relation to said prick mark, edge trimming the outsole to a predetermined shape and size under the guidance of the templet, thereafter forming a seam attaching the outsole to the shoe under the guidance of the sole edge, again locating a templet on the outsole with relation to the prick mark, and thereafter edge trimming the sole under the guidance of the templet.

11. The process of making shoes which comprises locating a freely movable templet, by means of cooperative positioning surfaces on the templet and on an outsole, in predetermined position longitudinally and laterally with relation to the contours of a last on which the outsole, after having been associated with an insole and upper of a shoe, is supported, edge trimming the outsole under the guidance of the templet to produce a sole edge having an outline of the shape and size determined by the templet and having a predetermined position with relation to the last contours of the shoe, and thereafter performing an operation on the shoe under the guidance of the sole edge.

12. The process of making shoes which comprises locating a freely movable templet, by means of cooperative positioning surfaces on the templet and on an outsole, in predetermined position longitudinally and laterally with relation to the contours of a last on which the outsole, after having been associated with an insole and upper of a shoe, is supported, edge trimming the outsole under the guidance of the templet to produce a sole edge having an outline of the shape and size determined by the templet and having a predetermined position with relation to the last contours of the shoe, and thereafter forming a seam attaching the outsole to the shoe under the guidance of the sole edge.

In testimony whereof I have signed my name to this specification.

ALFRED R. MORRILL.